Sept. 5, 1950        R. A. BELL        2,521,033
LAWN MOWER EDGER ATTACHMENT
Filed Feb. 4, 1949        2 Sheets-Sheet 2
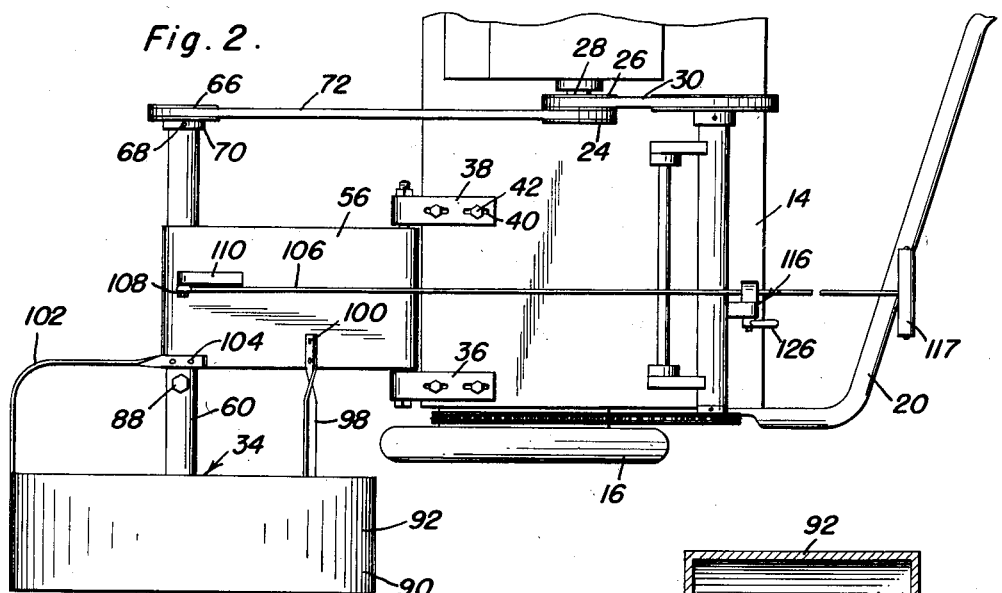
Fig. 2.
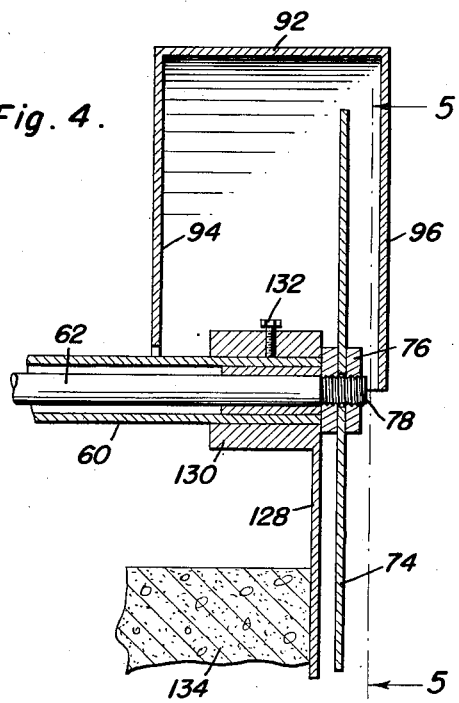
Fig. 4.
Fig. 5.
Inventor
Rowland A. Bell
By Clarence A. O'Brien
and Harvey B. Jacobson
Attorneys Patented Sept. 5, 1950

2,521,033

UNITED STATES PATENT OFFICE 2,521,033

LAWN MOWER EDGER ATTACHMENT

Rowland A. Bell, Miami, Fla.

Application February 4, 1949, Serial No. 74,654

6 Claims. (Cl. 56—256)

This invention relates to an attachment for a power driven lawn mower and has for its primary object to enable the lawn mower to uniformly and easily trim or cut the edge of a lawn or the trench adjacent a sidewalk.

Another important object of this invention is to provide an edge trimming attachment for a lawn mower which is easily and conveniently secured to a standard power lawn mower or the like and which may be conveniently raised to an inoperative position or lowered to an operative cutting position.

A further important object of this invention is to provide a guide means for the edge trimming attachment and to provide a shield structure therefor to prevent injury to the operator or damage to the mower structure due to debris or a stone tossed rearwardly by the edge cutting blade.

These and ancillary objects and structural features of merit are attained by this invention, preferred embodiments of which are set forth in the following description and illustrated in the accompanying drawings, wherein:

Figure 2 is a top plan view thereof;

Figure 3 is a longitudinal sectional view taken on line 3—3, looking in the direction of the arrows of Figure 1;

Figure 4 is a detail sectional view of the cutting blade and illustrating one embodiment of the guide means associated therewith;

Figure 5 is an enlarged side elevational view thereof, taken substantially on line 5—5 of Figure 4, and Figure 6 is a detail sectional view of the means provided for locking the operating rod for raising and lowering the edge trimming attachment, in a raised or lowered position.

Figure 1:
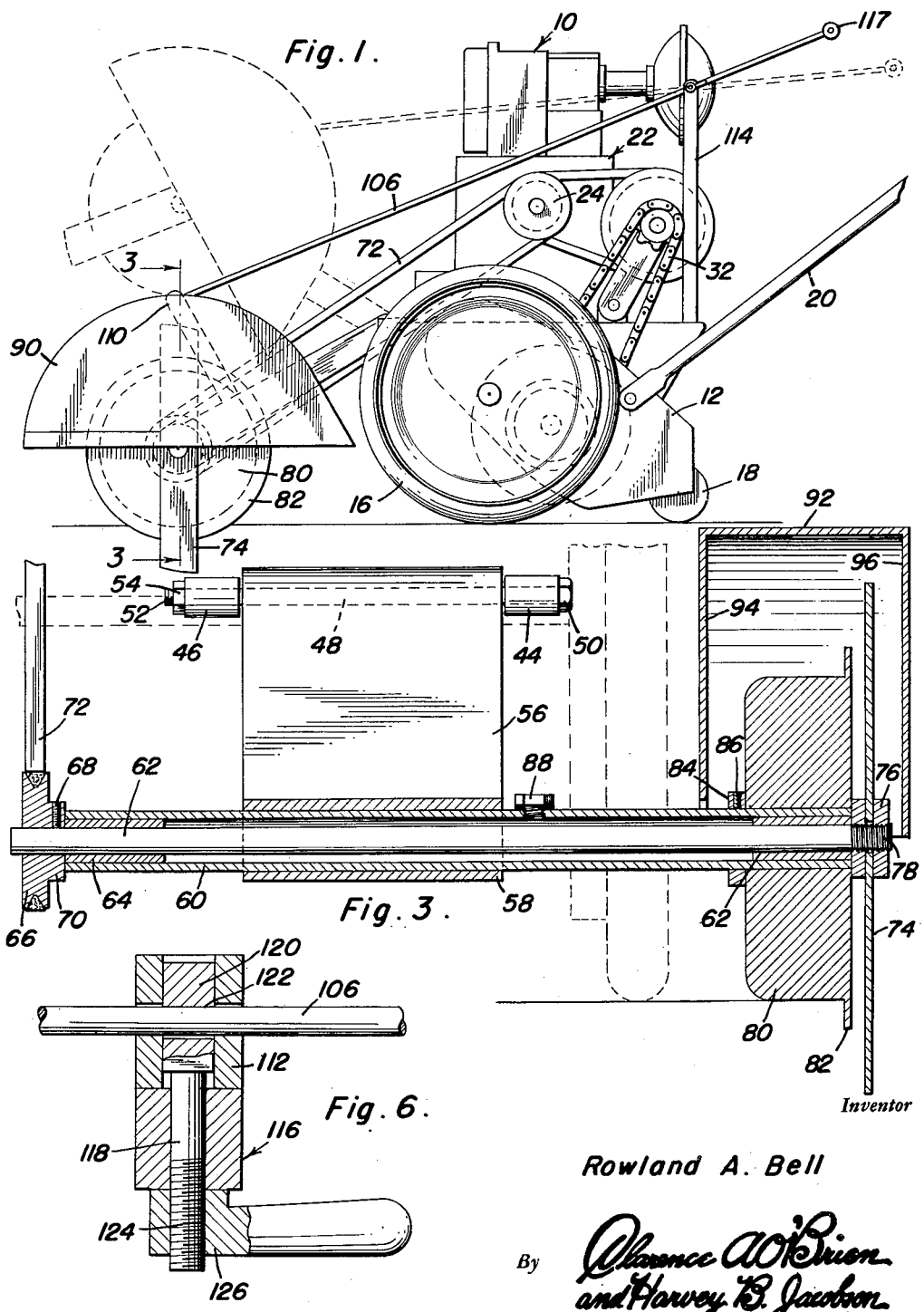
Figure 1 is an elevational view of a conventional power driven lawn mowing machine, illustrating this invention operatively attached thereto.

Referring now more particularly to the drawings, and with particular references to Figures 1-3 thereof, there is shown a standard power driven mowing unit 10 having a frame consisting of opposed side plates 12 and a horizontally disposed motor bed plate 14, which serves also to space the side plates from each other. Each of the vertically disposed side plates carries a wheel 16 rotatably associated therewith by means of a stub axle. At the rear or trailing edge of the side plates there is revolvably mounted a guide roller 18, which functions to support the rear end of the frame. A guiding handle structure 20 extends rearwardly from the side plates. A prime mover, such as a gasoline engine 22 is mounted on the motor bed plate 14 and a pair of pulleys 24 and 26 are keyed on the extending drive shaft 28 thereof. A belt 30 is entrained around the pulley 26 and serves to drive the cutting wheel of the mowing machine through a drive transmission means 32.

The edge trimming attachment for the lawn mower, generally designated by the character reference 34, is mounted for swivel movement at the front of the motor bed plate by means of supporting arms 36 and 38. The supporting arms 36 and 38 are formed with adjusting slots 40 in which are positioned fastening means 42 engaged in the plate 14. The supporting arms 36 and 38 terminate in extending bearing sleeves 44 and 46 within which is rotatably journaled a shaft 48. The shaft 48 is formed with a head 50 at one end and an externally threaded opposing end 52 on which is threadingly secured a locking nut 54. A frame member 56 is secured at one end on the shaft 48 between the bearing sleeves 44 and 46 and is adapted for pivotal movement thereon. The opposing end of the frame terminates in a sleeve 58 within which is disposed transversely an axle housing or tubular member 60. A shaft 62 is rotatably disposed within the housing 60 and the opposing ends thereof are spaced from the housing by means of bearings 62 and 64.

A V-shaped pulley 66 is fixed to one of the extending ends of the axle or shaft by means of a set screw 68 inserted through the collar 70 of the pulley. A belt 72 operatively connects the pulley 66 with the pulley 24 carried by the drive shaft of the motor.

A cutting blade 74 is secured on the opposing externally threaded end of the axle or shaft by means of a flange nut 76 threadingly engaged on the extending end 78. A guide wheel 80 having an annular peripheral flange 82 is secured on the axle housing, adjacent the cutting blade by means of a coupling collar 84, which is frictionally engaged on the axle housing through the medium of a set screw 86. The space within the axle housing is adapted to be filled with oil and for that purpose, an externally threaded plug 88 is detachably secured to the wall of the housing.

An arcuate shield 90 is secured about the cutting blade 74 and the guide wheel 80 to prevent stones or the like articles from being tossed up rearwardly towards the mowing machine and the operator. The shield 90 comprises an arcuate wall 92 having opposed side walls 94 and 96, the latter being positioned on opposite sides of the cutting blade, as seen in Figure 3. The shield is secured to the frame member 56 by means of an arm 98 extending laterally from the side wall 94 and secured by fastening members 100 to the frame. The forward or leading edge of the shield is secured to the frame by means of an angular bracket arm 102 extending integrally therefrom and secured as at 104 to the forward edge of the frame.

Means is provided for raising the edge trimming attachment from a horizontal operative position to a vertical inoperative position and preferably comprises an elongated operating rod 106 which is pivotally secured as at 108 to an arm 110 extending upwardly from the frame 56. The operating rod 106 is slidably disposed through a block 112 carried by an upright standard 114, which is anchored to the motor bed plate 14. The rod terminates in a transversely disposed handle 117, whereby the same may be easily moved rearwardly and forwardly to raise and lower the edge trimming attachment.

As seen in Figure 6, locking means 116 is provided for securing the rod and, correspondingly, the edge cutting attachment in an inoperative and operative position. As aforestated, the rod is slidably disposed through a block 112 which is disposed on one side of the standard 114, adjacent the upper edge thereof. A lug 118 is formed with an enlarged head 120 having a transversely disposed opening 122 formed therein. The rod 106 is slidably disposed through the opening 122, which is adapted for longitudinal alignment with the aligned openings in the block 112. The lug 118 is transversely disposed through the standard 114 and terminates in an externally threaded extremity 124 upon which is disposed a locking handle 126. Thus, by rotating the handle 126, the lug 118 is moved transversely through the standard 114 and the head 120 thereof is moved relative to the standard, so that the rod 106 is locked in the opening 122 thereof by the engagement of the rod against the outer wall of the opening and the inner walls of the openings of the block 112.

It can thus be appreciated that when the edge trimmer is in a lowered position, the shaft or axle 62 will be rotated through the drive belt 72, associated with the motor 22. Rotation of the belt 72 and corresponding rotation of the shaft 62 will effect the desired rotation of the cutting blade 74. The high speed operation of the cutting blade will uniformly and neatly cut the grass along borders or flower beds and adjacent the sidewalk. As can be seen, the guide wheel 80 is adapted to rotate along the edge of the sidewalk, with the flange 82 thereof engaged in the outer edge of the sidewalk, adjacent the conventional trench formed between the edge of the sidewalk and the adjacent edge of the lawn. Thus, the guide wheel principally functions to prevent the cutting blade 74 from engaging the sidewalk and thereby obviates the possibility of damage or injury being imparted to the blade as a result of such consequent engagement between the blade and sidewalk.

Rearward sliding movement of the operating rod 106 to the handle 116 will cause the edge trimming attachment to be raised to a vertical position, as seen in Figure 1. The rod can be locked, by means of the locking means, illustrated in Figure 6, so that the edge trimming attachment is in a raised position. When the attachment is in a raised position, the blade will be sustained in a non-rotative position, due to the slack of the drive belt 72. Thus, though the motor is employed and the shaft is rotated to rotate the drive pulley 26 and necessarily the pulley 24, the edge trimmer attachment will be sustained free from rotation, due to the slack of the side belt 72. Of course, the shield 90 is rigidly mounted above the cutting blade and guide wheel, so that the same is at all times positioned over the upper portion of the cutting blade.

A further embodiment of the guide means is illustrated in Figures 4 and 5, wherein the structure illustrated therein is adapted for use, when the edge trimming attachment is employed for trimming the grass along flower beds, borders or the like. In the latter respect, a vertically disposed guide arm 128 is held in a rigid detachable position by means of a laterally disposed collar 130, which is secured by a fastening member 132 concentrically on the ends of the axial housing. The guide or spacing arm 128 is adapted to depend vertically from the axle housing and to space the cutting blade 74 from engagement with the edge of the sidewalk or border 134 of a flower garden. Of course, the shield structure and other structure for operating the cutting blade and for raising and lowering the blade and appurtenant structure is the same as illustrated with respect to the other embodiment.

It can thus be seen that the lawn mower edger attachment can be easily and conveniently attached to a standard power lawn mower and with minor variations can be adapted for attachment to any of the standard types of mowers. Thus, the supporting arms 36 and 38, by means of the slots 40 will enable the frame 56 and the axle housing and axle to be attached to any of the standard types of mowers.

Once the attachment has been secured to a mower, it will not be necessary to remove the same, since it can be easily raised to an inoperative position and lowered to an operative position, when it is desired to employ the same.

Inasmuch as certain changes can be carried out in various details of structure and operation of the device, it is to be understood that these changes may be effected as coming within the spirit and scope of the appended claims.

Having described the invention, what is claimed as new is:

1. In combination with a power driven lawn mower having a frame and a motor mounted thereon, an edge trimming attachment comprising a support pivotally mounted for vertical swinging movement on the mower frame, an elongated sleeve transversely carried by the support, a shaft rotatably journaled in the sleeve, a cutting blade detachably fixed on one end of the shaft, a guide wheel having a peripheral flange rotatably journaled on the sleeve adjacent to the blade, means connected between the other end of the shaft and the motor for rotating the shaft.

2. In combination with a power driven lawn mower having a frame and a motor mounted thereon, an edge trimming attachment comprising a support pivotally mounted for vertical swinging movement on the mower frame, an elongated sleeve transversely carried by the support, a shaft rotatably journaled in the sleeve, a cutting blade detachably fixed on one end of the shaft, a guide wheel having a peripheral flange rotatably journaled on the sleeve adjacent to the blade, means connected between the other end of the shaft and the motor for rotating the shaft, and means for raising said frame about its pivot including an arm projecting upwardly from the support, a rod pivotally connected at one end to the arm and extending rearwardly and means for locking the rod to the frame.

3. In combination with a power driven lawn mower having a frame and a motor mounted thereon, an edge trimming attachment comprising a support pivotally mounted for vertical swinging movement on the mower frame, an elongated sleeve transversely carried by the support, a shaft rotatably journaled in the sleeve, a cutting blade detachably fixed on one end of the shaft, a guide wheel having a peripheral flange rotatably journaled on the sleeve adjacent to the blade, means connected between the other end of the shaft and the motor for rotating the shaft, a shield overlying the blade and a support arm secured to the shield and mounted on the frame.

4. In combination with a power driven lawn mower, having a portable frame and a motor mounted thereon, an edge trimming attachment comprising a pair of parallel arms projecting from the frame and adjustably mounted thereon, a frame pivoted at its inner end to the arms, a sleeve transversely carried by the outer end of the frame, a shaft rotatably journaled in the sleeve and having its ends projecting from the sleeve, a cutter detachably fixed on one of the ends of the shaft, guide means for the cutter mounted on the sleeve adjacent to the cutter, drive means connected between the other end of the shaft and the motor, means for raising the frame about the pivot and means for locking the frame in adjusted positions.

5. The combination of claim 4, wherein said means for raising and lowering the frame includes an operating rod pivotally associated with the frame, an upright standard secured to the mower frame and said locking means associated with the standard.

6. The combination of claim 5, wherein said locking means includes a fixed member within which the rod is slidably disposed and a movable member disposed in said fixed member and through which the rod is slidably disposed.

ROWLAND A. BELL.

REFERENCES CITED

The following references are of record in the file of this patent:

UNITED STATES PATENTS

| Number | Name | Date |
|---|---|---|
| 1,054,320 | Slatter | Feb. 25, 1913 |
| 1,238,595 | Sundholm | Aug. 28, 1917 |
| 1,654,574 | Brown | Jan. 3, 1928 |
| 1,770,434 | Schleicher | July 15, 1930 |
| 2,148,841 | Senior | Feb. 28, 1939 |
| 2,185,659 | Chernow | Jan. 2, 1940 |
| 2,220,342 | Maga | Nov. 5, 1940 |